US012682861B2

(12) United States Patent
Chen et al.

(10) Patent No.: US 12,682,861 B2
(45) Date of Patent: Jul. 14, 2026

(54) DISPLAY PANEL AND DISPLAY APPARATUS

(71) Applicants: Chongqing BOE Smart Electronics System Co., Ltd., Chongqing (CN); BOE Technology Group Co., Ltd., Beijing (CN)

(72) Inventors: Lichun Chen, Beijing (CN); Yunyan Xie, Beijing (CN); Bo Liu, Beijing (CN); Qiangeng Cheng, Beijing (CN)

(73) Assignees: Chongqing BOE Smart Electronics System Co., Ltd., Beijing (CN); BOE Technology Group Co Ltd, Beijing (CN)

( * ) Notice: Subject to any disclaimer, the term of this patent is extended or adjusted under 35 U.S.C. 154(b) by 168 days.

(21) Appl. No.: 18/701,628

(22) PCT Filed: Apr. 25, 2023

(86) PCT No.: PCT/CN2023/090640
§ 371 (c)(1),
(2) Date: Apr. 16, 2024

(87) PCT Pub. No.: WO2023/207993
PCT Pub. Date: Nov. 2, 2023

(65) Prior Publication Data
US 2025/0232738 A1      Jul. 17, 2025

(30) Foreign Application Priority Data

Apr. 29, 2022    (CN) ......................... 202210475132.4

(51) Int. Cl.
*G09G 3/34*        (2006.01)
*G02F 1/167*       (2019.01)
(Continued)

(52) U.S. Cl.
CPC ............. *G09G 3/344* (2013.01); *G02F 1/167* (2013.01); *G02F 1/1685* (2019.01); *H04B 5/26* (2024.01);
(Continued)

(58) Field of Classification Search
None
See application file for complete search history.

(56) References Cited

U.S. PATENT DOCUMENTS 8,223,097 B2 *    7/2012    Lin ...................... G09G 3/3677
345/87
9,484,003 B2 *   11/2016    VanBlon .................. G09G 5/34
(Continued)

FOREIGN PATENT DOCUMENTS

CN          206096716 U        4/2017
CN          109451565 A        3/2019
(Continued)

OTHER PUBLICATIONS

International Search Report for PCT/CN2023/090640 Mailed Aug. 5, 2023.

*Primary Examiner* — Fred Tzeng

(57) ABSTRACT

A display panel and a display apparatus. The display panel comprises an electronic-paper display unit and a display control circuit. The display control circuit comprises a capacitor energy storage module, an antenna module, a control module and a comparator, wherein the antenna module is connected to the capacitor energy storage module, and charges the capacitor energy storage module in response to a radio-frequency signal; the control module is connected to the capacitor energy storage module and the electronic-paper display unit; the comparator is connected to the control module and the electronic-paper display unit; and when the voltage of the capacitor energy storage module is
(Continued)

greater than a preset threshold voltage, power is supplied to the electronic-paper display unit.

19 Claims, 3 Drawing Sheets

(51) Int. Cl.
| | |
|---|---|
| *G02F 1/1685* | (2019.01) |
| *H04B 5/26* | (2024.01) |
| *G02F 1/1675* | (2019.01) |

(52) U.S. Cl.
CPC ................ *G02F 2001/1678* (2013.01); *G09G 2300/0842* (2013.01); *G09G 2330/021* (2013.01); *G09G 2370/16* (2013.01)

(56) References Cited

U.S. PATENT DOCUMENTS

| | | | | |
|---|---|---|---|---|
| 10,068,514 B2 * | 9/2018 | Lin | ........................ | G09G 3/006 |
| 10,360,867 B2 * | 7/2019 | Wu | ........................ | G06F 1/266 |
| 2010/0214836 A1 * | 8/2010 | Honda | .................. | G11C 16/30 |
| | | | | 365/185.18 |
| 2014/0118422 A1 * | 5/2014 | Shang | ................ | H04N 13/359 |
| | | | | 345/87 |
| 2014/0368479 A1 * | 12/2014 | Bae | ........................ | G09G 5/18 |
| | | | | 345/204 |
| 2015/0091851 A1 * | 4/2015 | Reynolds | .............. | G06F 3/0445 |
| | | | | 345/174 |
| 2015/0116296 A1 | 4/2015 | Greene | | |
| 2017/0323501 A1 * | 11/2017 | Sample | .............. | G06K 7/10366 |
| 2018/0053469 A1 * | 2/2018 | Hao | ....................... | G09G 3/325 |
| 2018/0240390 A1 * | 8/2018 | Cheng | .................. | G09G 3/2014 |
| 2018/0261152 A1 * | 9/2018 | Singh | ................... | G09G 3/3225 |
| 2020/0162128 A1 * | 5/2020 | Greene | .................. | H04B 5/266 |
| 2020/0285820 A1 * | 9/2020 | Hu | ....................... | G06F 13/4204 |
| 2021/0056877 A1 * | 2/2021 | Chew | ................. | F16M 11/2021 |
| 2021/0335255 A1 * | 10/2021 | Li | ......................... | G09G 3/3674 |
| 2021/0398495 A1 * | 12/2021 | Liu | ........................ | G06F 3/0412 |
| 2022/0270554 A1 * | 8/2022 | Morosawa | ........... | G02F 1/1685 |
| 2022/0301476 A1 * | 9/2022 | Jin | ........................ | G09G 3/3266 |
| 2022/0319444 A1 * | 10/2022 | Hu | ......................... | G09G 3/344 |
| 2024/0074255 A1 * | 2/2024 | Chang | .................... | G02F 1/167 |

FOREIGN PATENT DOCUMENTS

| | | | |
|---|---|---|---|
| CN | 111210753 A | 5/2020 | |
| CN | 111553451 A | 8/2020 | |
| CN | 112331154 A | 2/2021 | |
| CN | 107871476 B | 4/2021 | |
| CN | 113327558 A | 8/2021 | |
| CN | 114724521 A | 7/2022 | |
| JP | H09224000 A | 8/1997 | |
| JP | 2021-33222 A | 3/2021 | |

\* cited by examiner

10

DISPLAY PANEL AND DISPLAY APPARATUS

CROSS-REFERENCE TO RELATED APPLICATIONS

The present application is a U.S. National Phase Entry of International Application PCT/CN2023/090640 having an international filing date of Apr. 25, 2023, which claims priority of Chinese patent application No. 202210475132.4, filed to CNIPA on Apr. 29, 2022 and entitled "Display panel and Display Apparatus", the contents of which should be interpreted as being incorporated herein by reference in their entireties.

TECHNICAL FIELD

The present disclosure relates to, but is not limited to, the field of display, in particular to a display panel and a display apparatus.

BACKGROUND

Electronic paper related products which have low power consumption and are environmentally friendly have been widely studied and favored by the public in recent years. Electronic paper related products have been widely used in the market, such as electronic tags, bedside cards, infusion cards, electronic table card, electronic display cards, electronic badges, bus stop boards and so on.

SUMMARY

The following is a summary of subject matter described herein in detail. This summary is not intended to limit the protection scope of claims.

An exemplary embodiment of the present disclosure provides a display panel, including:
an electronic paper display unit; and
a display control circuit;
wherein the display control circuit includes:
a capacitor energy storage module;
an antenna module connected with the capacitor energy storage module and configured to charge the capacitor energy storage module in response to a radio frequency signal;
a control module connected with the capacitor energy storage module and the electronic paper display unit, wherein the capacitor energy storage module is configured to supply power to the control module, and the control module is configured to transmit display data to the electronic paper display unit; and
a comparator connected with the control module and the electronic paper display unit, wherein the comparator is configured to supply power to the electronic paper display unit when a voltage of the capacitor energy storage module is greater than a preset threshold voltage, and the electronic paper display unit refreshes display contents according to the display data.

In an exemplary embodiment, the radio frequency signal is emitted by a terminal device provided with a signal transmitter, and the terminal device includes a door control, a computer or a mobile phone.

In an exemplary embodiment, a refresh frequency of the electronic paper display unit is less than a preset threshold frequency, and the preset threshold frequency includes 9 frames/second, 10 frames/second, 12 frames/second, 15 frames/second, or 20 frames/second.

In an exemplary embodiment, the comparator has a quiescent current less than 0.9 μA and a workload capacity greater than 15 mA.

In an exemplary embodiment, the electronic paper display unit includes an electronic ink layer and a drive transistor whose gate charge is less than a preset charge threshold and whose parasitic capacitance is less than a preset capacitance threshold.

In an exemplary embodiment, the electronic ink layer includes a microcapsule structure including white particles, black particles and electrophoretic ink.

In an exemplary embodiment, the electrophoretic ink is transparent;
a material of the white particles is titanium dioxide $TiO_2$ with positive charges; and
a material of the black particles is carbon black with negative charges.

In an exemplary embodiment, the microcapsule structure includes the black particles, red particles, and the electrophoretic ink.

In an exemplary embodiment, the electrophoretic ink is transparent;
a material of the black particles is carbon black with negative charges.

In an exemplary embodiment, the electronic paper display unit further includes an electrode layer and a pixel electrode layer arranged oppositely, wherein the electronic ink layer is arranged between the electrode layer and the pixel electrode layer.

In an exemplary embodiment, the preset threshold voltage is not less than 2.3 V.

In an exemplary embodiment, the antenna module includes an induction coil configured to convert the radio frequency signal into an electrical signal to charge the capacitor energy storage module.

In an exemplary embodiment, the capacitor energy storage module includes a patch capacitor.

In an exemplary embodiment, the control module comprises a micro control unit and a near field communication chip, wherein the micro control unit is configured to control an operating state of the near field communication chip, and the near field communication chip generates the display data according to the radio frequency signal.

In an exemplary embodiment, the micro control unit communicates with the near field communication chip through an $I^2C$ bus.

In an exemplary embodiment, the control module further includes a flash memory unit configured to store the display data.

In an exemplary embodiment, the flash memory unit communicates with the micro control unit through a Serial Peripheral interface (SPI) bus.

In an exemplary embodiment, the flash memory unit is a flash memory, including a NAND flash memory, a vertical NAND flash memory (VNAND), and a NOR flash memory.

An embodiment of the present disclosure further provides a display apparatus including any one of the display panels described above.

Other aspects of the present disclosure may be comprehended after the drawings and the detailed descriptions are read and understood.

DETAILED DESCRIPTION

Figure 1:
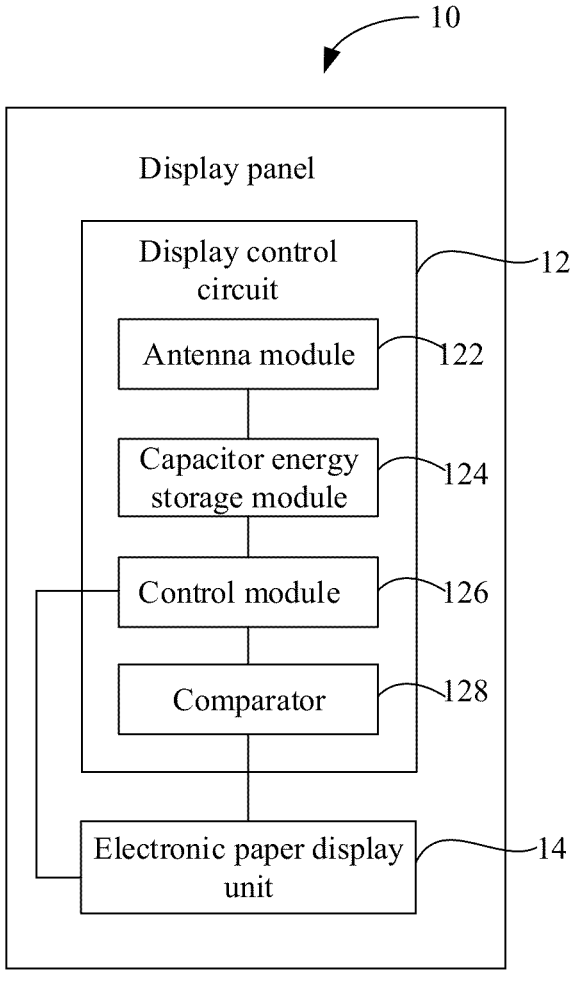
FIG. 1 is a schematic diagram of modules of a display panel according to some embodiments of the present disclosure.

Hereinafter, embodiments of the present disclosure will be described in detail, examples of which are illustrated in the accompanying drawings, wherein same or similar reference numerals throughout the description indicate same or similar elements or elements having same or similar functions. The embodiments described below with reference to the accompanying drawings are exemplary and are intended only to explain the embodiments of the present disclosure, but are not to be construed as limitations on the embodiments of the present disclosure.

The embodiments and features in the embodiments of the present disclosure may be randomly combined with each other if there is no conflict.

Hereinafter, implementations of the present disclosure will be described in detail, examples of which are illustrated in the accompanying drawings, wherein same or similar reference numerals throughout the description indicate same or similar elements or elements having same or similar functions. The implementations described below with reference to the accompanying drawings are illustrative, and are merely intended to explain the present disclosure, which cannot be construed as a limitation on the present disclosure.

In the description of the present disclosure, orientation or position relationships indicated by terms "center", "longitudinal", "transverse", "length", "width", "thickness", "upper", "lower", "front", "back", "left", "right", "vertical", "horizontal", "top", "bottom", "inside", "outside", "clockwise", "counterclockwise" and the like are based on the orientation or position relationships shown in the drawings, and are only for the convenience of description of the present disclosure and simplification of the description, but are not intended to indicate or imply that the mentioned device or element must have a specific orientation, or be constructed and operated in a particular orientation, and therefore they should not be construed as limitations on the present disclosure. In addition, terms "first" and "second" are used for descriptive purposes only and cannot be interpreted as indicating or implying relative importance or implicitly indicating a quantity of technical features indicated. Therefore, a feature defined by "first" and "second" may explicitly or implicitly indicates inclusion of one or more such features. In the description of the present disclosure, a meaning of "a plurality of" is two or more than two, unless otherwise specified with specific limitations.

In the description of the present disclosure, it should be noted that unless otherwise expressly specified and limited, the terms "mount", "connected" and "connect" should be understood in a broad sense. For example, a connection may be fixed connection, may be detachable connection or integral connection, may be mechanical connection, may be electrical connection or mutual communication, or may be direct connection, may be indirect connection through intermediate medium, may be internal communication between two elements, or interaction between the two elements. For those of ordinary skills in the art, specific meanings of the above terms in the present disclosure may be understood according to actual situations.

In the present disclosure, a first feature being "above" or "below" a second feature may include direct contact between the first and second features, or may include contact between the first and second features which is not direct but through an additional feature between them, unless otherwise expressly specified and defined. Moreover, the first feature being "over", in "above" or "on" the second feature may mean that the first feature is directly above or obliquely above the second feature, or simply mean that a level of the first feature is higher than that of the second feature. The first feature being "below", "beneath" or "under" the second feature may mean that the first feature is directly below or obliquely below the second feature, or simply mean that a level of the first feature is lower than that of the second feature.

In the following, many different embodiments or examples are provided for implementing different structures of the present disclosure. In order to simplify the disclosure of the present disclosure, components and arrangements of specific examples are described below. Of course, they are examples only and are not intended to limit the present disclosure. In addition, in the present disclosure, reference numbers and/or reference letters may be repeated in different examples. Such repetition is for a purpose of simplification and clarity, and it does not indicate a relationship between various embodiments and/or arrangements discussed. In addition, examples of various specific processes and materials are provided in the present disclosure, but those of ordinary skill in the art will be aware of applications of other processes and/or usages of other materials.

Figure 2:
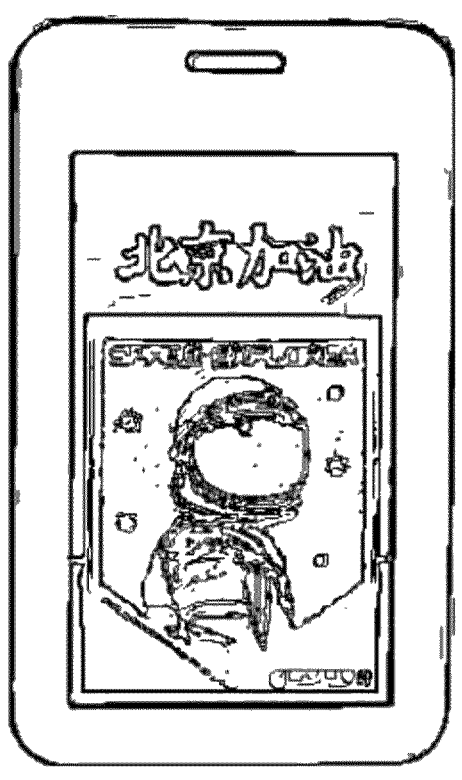
FIG. 2 is a schematic diagram of a display scene of a display panel according to some embodiments of the present application.

With reference to FIGS. 1 and 2, an exemplary embodiment of the present disclosure provides a display panel 10. The display panel 10 includes an electronic paper display unit 14 and a display control circuit 12. The display control circuit 12 includes a capacitor energy storage module 124, an antenna module 122, a control module 126 and a comparator 128.

Among them, the antenna module 122 is connected to the capacitor energy storage module 124, and the antenna module 122 is configured to charge the capacitor energy storage module 124 in response to a radio frequency signal. The control module 126 is connected to the capacitor energy storage module 124 and the electronic paper display unit 14. The capacitor energy storage module 124 is configured to supply power to the control module 126. The control module 126 is arranged to transmit display data to the electronic paper display unit 14. The comparator 128 is connected to the control module 126 and the electronic paper display unit 14, and the comparator 128 is configured to supply power to the electronic paper display unit 14 when a voltage of the capacitor energy storage module 124 is greater than a preset threshold voltage, such that the electronic paper display unit 14 refreshes display contents according to the display data.

In the display panel 10 of the exemplary embodiment of the present disclosure, through arrangement of the capacitor energy storage module 124, the antenna module 122, the control module 126, and the comparator 128, the comparator 128 can supply power to the electronic paper display unit 14 when the voltage of the capacitor energy storage module 124 is greater than the preset threshold voltage, and the electronic paper display unit 14 refreshes display contents according to the display data. In this way, problems such as loss of transmission data and abnormal picture update caused by insufficient energy of the display panel 10 can be avoided, a the display effect of the display panel 10 can be improved.

In an exemplary embodiment, the display panel 10 may be a passive NFC electronic badge. Near Field Communication (NFC) is a short-range high-frequency radio technology. Its transmission speed is 106 Kbit/s, 212 Kbit/s or 424 Kbit/s. That is, the display panel 10 can realize data transmission and power supply through the NFC.

In an exemplary embodiment, the radio frequency signal may be emitted by a terminal device such as a door control, a computer or a mobile phone provided with a signal transmitter.

In some exemplary embodiments, a refresh frequency of the electronic paper display unit 14 is less than a preset threshold frequency. In an exemplary embodiment, the higher the refresh frequency of the electronic paper display unit 14, the greater the power consumption of the electronic paper display unit 14, and the greater the power consumption, the more likely to cause the loss of transmission data and abnormal picture update due to the insufficient energy, while the existing refresh frequency is usually 25 frames/second to 30 frames/second. Therefore, in order to further reduce the power consumption of the electronic paper display unit 14, the refresh frequency of the electronic paper display unit 14 can be reduced. The preset threshold frequency may be 9, 10, 12, 15, 20 or even more. In an exemplary embodiment of the present disclosure, the preset threshold frequency may be set to 9, that is, the refresh frequency of the electronic paper display unit 14 is less than 9 frames per second, for example, the refresh frequency of the electronic paper display unit 14 may be 8 frames per second. Thus, overall power consumption of the display panel 10 can be reduced, and the display effect of the display panel 10 can be further improved.

In some exemplary embodiments, the comparator 128 has a quiescent current less than 0.9 μA and a workload capacity greater than 15 mA.

Thus, the comparator 128 can normally supply power to the electronic paper display unit 14, thereby ensuring that the electronic paper display unit 14 can normally transmit data and refresh, and can reduce its own loss and improve efficiency, thereby reducing loss of the entire display control circuit 12.

In some exemplary embodiments, the electronic paper display unit 14 includes an electronic ink layer and a drive transistor whose gate charge is less than a preset charge threshold and whose parasitic capacitance is less than a preset capacitance threshold.

In an exemplary embodiment, the parasitic capacitance includes an input parasitic capacitance Ciss, an output parasitic capacitance Coss, and a reverse transfer parasitic capacitance Crss. The gate charge includes a total gate charge Qg, a gate-source charge Qgs, and a gate-drain charge Qgd.

In an exemplary embodiment, a circuit loss of the drive transistor mainly depends on the parasitic capacitance of the drive transistor and a gate drive loss, while the gate drive loss is mainly determined by a gate charge parameter. The smaller the gate charge parameter, the smaller the resistance in the loop and the greater the current, and the smaller the parasitic capacitance, the faster the switching speed in the circuit, which can effectively improve an input current in the loop. Therefore, setting the gate charge of the drive transistor to be less than the preset charge threshold and setting the parasitic capacitance of the drive transistor to be less than the preset capacitance threshold makes an input current of the electronic paper display unit 14 more stable and reduces the circuit loss of the drive transistor.

Specific values of the preset charge threshold and the preset capacitance threshold are not limited, and can be set according to an actual condition of a product.

In addition, in some exemplary embodiments, the overall power consumption of the display panel 10 may be further reduced by adjusting a waveform of a driving voltage of the electronic paper display unit 14 during a driving process to improve a current value of the entire driving process. For example, the driving voltage of the electronic paper display unit 14 may be divided into three stages. In a first stage, soft start time is 10 milliseconds and a driving intensity level is 3. In a second stage, minimum closing time of a gate control I/O port (GDR) of the drive transistor is 1.54 us and the driving intensity level is 3. In a third stage, the minimum closing time of the gate control I/O port of the drive transistor is 3.34 μs, and the driving intensity level is 3.

In some exemplary embodiments, the electronic ink layer includes a microcapsule structure that includes white particles, black particles, and electrophoretic ink within the microcapsule structure.

In an exemplary embodiment, the electronic paper display unit 14 further includes an electrode layer and a pixel electrode layer arranged oppositely. An electronic ink layer is arranged between the electrode layer and the pixel electrode layer. The electrophoretic ink is transparent. The white particles are generally made of titanium dioxide ($TiO_2$) with positive charge, and the black particles are generally made of carbon black with negative charge. In an initial state, reflective particles such as white particles and black particles are suspended in the transparent electrophoretic ink, arranged uniformly and move randomly. When an electric field is applied between the pixel electrode layer and the transparent electrode layer, white particles and black particles move under the action of the electric field. For example, when negative charges are applied to the transparent electrode layer and positive charges are applied to the pixel electrode layer, the white particles gather on a side of the transparent electrode layer and the black particles gather on a side of the pixel electrode layer. At this time, the electronic paper display device displays a white picture under reflection of natural light. When positive charges are applied to the transparent electrode layer and negative charges are applied to the pixel electrode layer, the white particles gather on the side of the pixel electrode layer and the black particles gather on the side of the transparent electrode layer. At this time, the electronic paper display unit 14 displays a black picture under the reflection of natural light, thereby achieving color conversion between characters and images.

In some exemplary embodiments, the white particles, the black particles in the microcapsule structure may also be replaced with reflective particles having colors, for example, in some exemplary embodiments, black particles, red particles and electrophoretic ink are included within the microcapsule structure, wherein half of the region is red (or green, blue, etc.) and the other half of the region is black reflective particles. Among them, the red region is a charged region. In this way, when an electric field is applied between the pixel electrode layer and the transparent electrode layer, the red (or green or blue) surface of the reflective particles can be oriented toward a display surface according to a direction of the electric field, thereby achieving reflection of external light irradiated on the reflective particles, thus forming colored displaying of the electronic paper display unit 14.

In some exemplary embodiments, the preset threshold voltage is not less than 2.3 V.

In an exemplary embodiment, in this exemplary embodiment, a power supply voltage of the electronic paper display unit 14 needs to be greater than 2.2 V, that is, the voltage supplied to the electronic paper display unit 14 by the comparator 128 needs to be greater than 2.2V. Therefore, in order to satisfy the power supply voltage of the electronic paper display unit 14, the preset threshold voltage is set to be greater than or equal to 2.3 V such that the voltage supplied to the electronic paper display unit 14 by the comparator 128 is greater than 2.2V, and the problem of abnormal display of the electronic paper display unit 14 can be avoided.

Figure 3:
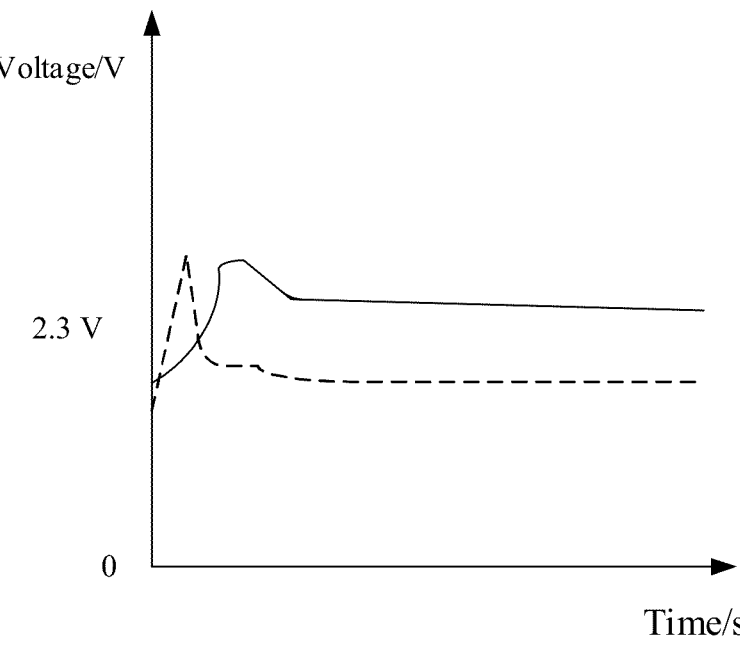
FIG. 3 is a schematic diagram of comparison between a power supply voltage of an electronic paper display unit and a power supply voltage of a passive NFC badge according to the present disclosure.

With reference to FIG. 3, FIG. 3 is a schematic diagram of comparison between the power supply voltage of the electronic paper display unit 14 and a power supply voltage of a passive NFC badge according to an exemplary embodiment of the present disclosure, in which a solid line indicates the power supply voltage of the electronic paper display unit 14 of the present disclosure, and a dotted line indicates the power supply voltage of the passive NFC badge. It can be seen that the power supply voltage of the present disclosure can be kept above 2.3 V, which can ensure normal operation of data transmission and refreshing of the electronic paper display unit 14.

Figure 4:
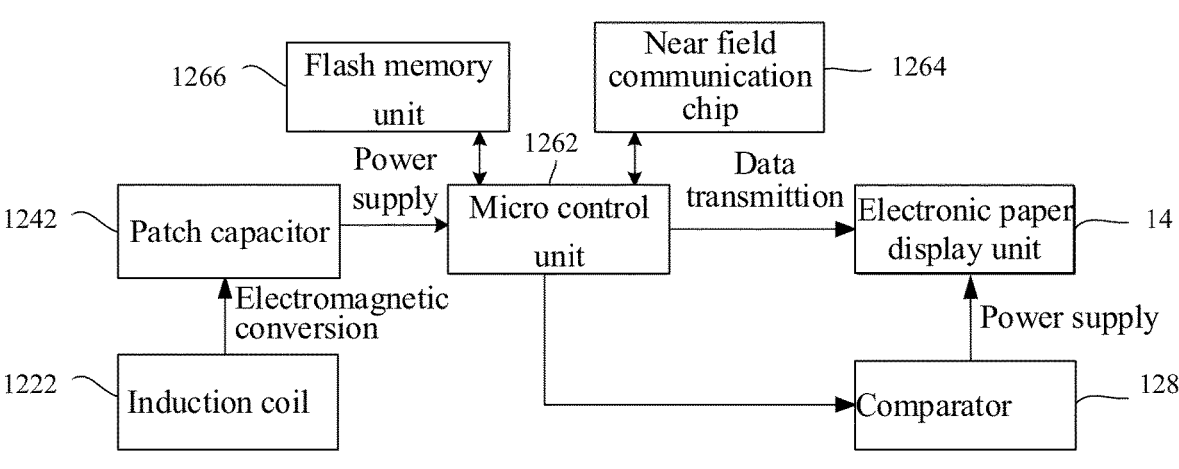
FIG. 4 is a schematic diagram of modules of a display panel according to some embodiments of the present disclosure.

With reference to FIGS. 1 and 4, in some exemplary embodiments, the antenna module 122 includes an induction coil 1222. The induction coil 1222 is coupled to the capacitor energy storage module 124 and configured to convert a radio frequency signal into an electrical signal to charge the capacitor energy storage module 124.

In an exemplary embodiment, the number of turns of the induction coil 1222 may be set according to power supply requirements of the electronic paper display unit 14. When the display panel 10 is close to a terminal device, the induction coil 1222 can receive the radio frequency signal and convert the radio frequency signal into the electrical signal, thereby transmitting the electrical signal to the capacitor energy storage module 124 to achieve charging of the capacitor energy storage module 124.

In some exemplary embodiments, the capacitor energy storage module 124 includes a patch capacitor 1242.

In an exemplary embodiment, the patch capacitor 1242 is called a multilayer (multilayer, laminated) ceramic chip capacitor, which is equivalent to an insulator and can act as an open circuit in a DC circuit. The patch capacitor 1242 has characteristics of small size, high withstand voltage, very low Equivalent Series Resistance (ESR) at high frequency resonance point and strong stability.

A passive NFC badge uses Farad capacitor for energy storage. However, a thickness of the Farad capacitor is usually more than 3 mm, which results in the overall thickness of the display panel 10 being relatively thick, and the price is expensive, resulting in the overall cost of the display panel 10 being relatively high. Therefore, by storing energy through the patch capacitor 1242, stability and reliability of the power supply of the electronic paper display unit 14 can be ensured, and the display panel 10 can be made thinner and easily portable.

In some exemplary embodiments, the control module 126 includes a micro control unit 1262 and a near field communication chip 1264. The micro control unit 1262 is configured to control an operating state of the near field communication chip 1264, and the near field communication chip 1264 generates display data according to the radio frequency signal.

In an exemplary embodiment, the micro control unit 1262 may communicate with the near field communication chip 1264 through an Inter-Integrated Circuit (I²C) bus. Herein, I²C bus is a simple, bidirectional two-wire synchronous serial bus, and it only needs two wires to transfer information between devices connected to the bus.

In some exemplary embodiments, the control module 126 further includes a flash memory unit 1266, and the flash memory unit 1266 is configured to store the display data.

The flash memory unit 1266 may communicate with the micro control unit 1262 through a Serial Peripheral Interface (SPI) bus for data transmission.

In an exemplary embodiment, the FLASH memory unit 1266 may be a FLASH flash memory. Flash memory is a type of non-volatile memory, which can keep data for a long time without current supply. Its storage characteristics are equivalent to those of hard disk. The flash memory combines advantages of ROM and RAM, and has the performance of electronic erasable and programmable, without losing data due to power failure, and has characteristics of fast data reading. The flash memory unit 1266 may include but is not limited to NAND flash memory, vertical NAND flash memory (VNAND), NOR flash memory, and the like. Thus, by storing the display data in the flash memory unit 1266, it is possible to exchange and transmit data with other digital products.

An embodiment of the present disclosure further provides a display apparatus, which includes the display panel 10 of any one of the aforementioned embodiments.

Those of ordinary skills in the art may understand that all or some of acts in the methods disclosed above, systems, functional modules or units in apparatuses may be implemented as software, firmware, hardware, and an appropriate combination thereof. In a hardware implementation, division of the function modules/units mentioned in the above description is not always corresponding to division of physical components. For example, a physical component may have multiple functions, or a function or an act may be executed by several physical components in cooperation. Some components or all components may be implemented as software executed by a processor such as a digital signal processor or a microprocessor, or implemented as hardware, or implemented as an integrated circuit such as a specific integrated circuit. Such software may be distributed on a computer-readable medium, and the computer-readable medium may include a computer storage medium (or a non-transitory medium) and a communication medium (or a transitory medium). As known to those of ordinary skills in the art, a term computer storage medium includes volatile or nonvolatile, and removable or irremovable media implemented in any method or technology for storing information (for example, a computer-readable instruction, a data structure, a program module, or other data). The computer storage medium includes, but is not limited to, an RAM, an ROM, an EEPROM, a flash memory or another memory technology, a CD-ROM, a Digital Versatile Disk (DVD) or another optical disk storage, a magnetic cartridge, a magnetic tape, magnetic disk storage or another magnetic storage apparatus, or any other medium that may be configured to store desired information and may be accessed by a computer. In addition, it is known to those of ordinary skill in the art that the communication medium usually includes a computer-readable instruction, a data structure, a program module, or other data in a modulated data signal of, such as, a carrier or another transmission mechanism, and may include any information delivery medium.

In the description of the specification, descriptions referring to terms "one embodiment", "some embodiments", "an exemplary embodiment", "an example", "a specific example", or "some examples" are intended to indicate that a specific feature, structure, material, or feature described in connection with the described embodiment or example is contained in at least one embodiment or example of the present disclosure. In this specification, schematic expressions of the above terms do not necessarily refer to a same implementation or example. Moreover, a specific feature, structure, material, or feature described may be combined in any one or more implementations or examples in a suitable manner.

Although the embodiments of the present disclosure have been shown and described above, it may be understood that the above embodiments are exemplary and cannot be interpreted as limitations on the present disclosure. An ordinary person skilled in the art may make changes, modifications, substitutions, and variations to the above embodiments within the scope of the present disclosure.

The invention claimed is:

1. A display panel, comprising:
an electronic paper display unit; and
a display control circuit;
wherein the display control circuit comprises:
a capacitor energy storage module;
an antenna module connected with the capacitor energy storage module and configured to charge the capacitor energy storage module in response to a radio frequency signal;
a control module connected with the capacitor energy storage module and the electronic paper display unit, wherein the capacitor energy storage module is configured to supply power to the control module, and the control module is configured to transmit display data to the electronic paper display unit; and
a comparator connected with the control module and the electronic paper display unit, wherein the comparator is configured to supply power to the electronic paper display unit when a voltage of the capacitor energy storage module is greater than a preset threshold voltage, and the electronic paper display unit refreshes display contents according to the display data;
wherein the electronic paper display unit comprises an electronic ink layer and a drive transistor whose gate charge is less than a preset charge threshold and whose parasitic capacitance is less than a preset capacitance threshold.

2. The display panel according to claim 1, wherein the radio frequency signal is emitted by a terminal device provided with a signal transmitter, and the terminal device comprises a door control, a computer or a mobile phone.

3. The display panel according to claim 2, wherein the antenna module comprises an induction coil configured to convert the radio frequency signal into an electrical signal to charge the capacitor energy storage module.

4. The display panel according to claim 1, wherein a refresh frequency of the electronic paper display unit is less than a preset threshold frequency, and the preset threshold frequency comprises 9 frames/second, 10 frames/second, 12 frames/second, 15 frames/second, or 20 frames/second.

5. The display panel according to claim 1, wherein the comparator has a quiescent current less than 0.9 µA and a workload capacity greater than 15 mA.

6. The display panel according to claim 1, wherein the electronic ink layer comprises a microcapsule structure comprising white particles, black particles and electrophoretic ink.

7. The display panel according to claim 6, wherein,
the electrophoretic ink is transparent;
a material of the white particles is titanium dioxide $TiO_2$ with positive charges; and
a material of the black particles is carbon black with negative charges.

8. The display panel according to claim 1, wherein the electronic ink layer comprises a microcapsule structure comprising black particles, red particles, and electrophoretic ink.

9. The display panel according to claim 8, wherein,
the electrophoretic ink is transparent; and
a material of the black particles is carbon black with negative charges.

10. The display panel according to claim 1, wherein the electronic paper display unit further comprises an electrode layer and a pixel electrode layer arranged oppositely,
wherein the electronic ink layer is arranged between the electrode layer and the pixel electrode layer.

11. The display panel according to claim 1, wherein the preset threshold voltage is not less than 2.3 V.

12. The display panel according to claim 1, wherein the antenna module comprises an induction coil configured to convert the radio frequency signal into an electrical signal to charge the capacitor energy storage module.

13. The display panel according to claim 1, wherein the capacitor energy storage module comprises a patch capacitor.

14. The display panel according to claim 1, wherein the control module comprises a micro control unit and a near field communication chip, the micro control unit is configured to control an operating state of the near field communication chip, and the near field communication chip generates the display data according to the radio frequency signal.

15. The display panel according to claim 14, wherein the micro control unit communicates with the near field communication chip through an Inter-Integrated Circuit ($I^2C$) bus.

16. The display panel according to claim 14, wherein the control module further comprises a flash memory unit configured to store the display data.

17. The display panel according to claim 16, wherein the flash memory unit communicates with the micro control unit through a Serial Peripheral interface (SPI) bus.

18. The display panel according to claim 16, wherein the flash memory unit is a flash memory, comprising a NAND flash memory, a vertical NAND flash memory (VNAND), and a NOR flash memory.

19. A display apparatus comprising the display panel according to claim 1.

* * * * *